United States Patent
Marshall (10) Patent No.: US 9,049,851 B2
(45) Date of Patent: Jun. 9, 2015

(54) LINE GUIDE

(75) Inventor: Marvin Joseph Marshall, Palm Bay, FL (US)

(73) Assignee: Malin Co., Cleveland, OH (US)

( * ) Notice: Subject to any disclaimer, the term of this patent is extended or adjusted under 35 U.S.C. 154(b) by 390 days.

(21) Appl. No.: 13/491,137

(22) Filed: Jun. 7, 2012

(65) Prior Publication Data

US 2012/0311916 A1 Dec. 13, 2012

Related U.S. Application Data (60) Provisional application No. 61/495,654, filed on Jun. 10, 2011.

(51) Int. Cl.
*A01K 87/04* (2006.01)

(52) U.S. Cl.
CPC ........................................ *A01K 87/04* (2013.01)

(58) Field of Classification Search
CPC ........................................................ A01K 87/04
USPC ......... 43/24, 19, 19.2, 23, 25, 21.2; 226/196.1
See application file for complete search history.

(56) References Cited

U.S. PATENT DOCUMENTS

| | | | |
|---|---|---|---|
| 343,802 A | 6/1886 | Everett | |
| 670,961 A | 4/1901 | Lenharth | |
| 1,231,150 A | 6/1917 | Gere | |
| 1,444,063 A | 2/1923 | Davis | |
| 1,964,631 A * | 6/1934 | Hansen | 43/24 |
| 2,227,868 A | 1/1941 | Tengel | |
| 2,398,862 A | 4/1946 | Sarkisian | |
| 2,573,647 A | 10/1951 | Marke | |
| 2,697,894 A * | 12/1954 | Graham et al. | 43/24 |
| 2,721,412 A | 10/1955 | Smiley | |
| 2,776,516 A | 1/1957 | Jennette | |
| 2,781,602 A | 2/1957 | Warford | |
| 2,872,751 A | 2/1959 | Mayfield | |
| 2,895,251 A | 7/1959 | Karry | |
| 3,060,618 A | 10/1962 | Grishkin | |
| 3,099,889 A | 8/1963 | Verneuil | |
| 3,222,811 A | 12/1965 | Henson | |
| 3,279,116 A | 10/1966 | Chapman | |
| 3,417,500 A | 12/1968 | Carabasse | |
| 3,608,226 A | 9/1971 | Stanley | |
| 3,987,573 A * | 10/1976 | Clayton | 43/17.2 |
| 4,011,680 A | 3/1977 | Rienzo, Sr. | |
| 4,051,618 A | 10/1977 | Ohmura | |

(Continued)

FOREIGN PATENT DOCUMENTS

| | | |
|---|---|---|
| JP | 4117232 | 4/1992 |
| JP | 08023832 A | 1/1996 |

(Continued)

OTHER PUBLICATIONS

Castaway Introduces "Microwave" Guide Equipped rods, located at http://www.tackletour.com/reviewicast10castaway.html, pp. 1-6, TackleTour LLC, 2000-2012.

*Primary Examiner* — David Parsley
*Assistant Examiner* — Danielle Clerkley
(74) *Attorney, Agent, or Firm* — Fay Sharpe LLP (57) ABSTRACT

A tubular line guide ring apparatus that is mountable to a line guide support and line guide ring of a fishing rod and that is capable of flexing to accommodate a range of line angles during casting, retrieval and fish fighting operations.

16 Claims, 6 Drawing Sheets

(56) References Cited

U.S. PATENT DOCUMENTS

| | | | |
|---|---|---|---|
| 4,080,748 A * | 3/1978 | Ohmura | ............ 43/24 |
| 4,174,583 A | 11/1979 | Ohmura | |
| 4,212,126 A | 7/1980 | Barnett | |
| 4,445,293 A | 5/1984 | Ohmura | |
| 5,381,619 A | 1/1995 | Watkins | |
| 5,401,345 A | 3/1995 | Park | |
| 5,491,881 A | 2/1996 | Collins | |
| 5,953,847 A | 9/1999 | Peterson | |
| 6,230,432 B1 | 5/2001 | Blank | |
| 6,263,609 B1 | 7/2001 | Kollodge et al. | |
| 7,300,012 B1 | 11/2007 | Hannon | |
| 7,533,484 B2 | 5/2009 | Markley et al. | |
| 2006/0090388 A1 | 5/2006 | Lee | |
| 2006/0283073 A1 | 12/2006 | Omura | |
| 2010/0236128 A1 | 9/2010 | Murray | |
| 2011/0289818 A1 | 12/2011 | Hannon | |

FOREIGN PATENT DOCUMENTS

| | | |
|---|---|---|
| JP | 2001190188 A | 7/2001 |
| JP | 2004081066 A | 3/2004 |
| JP | 2005095139 A | 4/2005 |

* cited by examiner

LINE GUIDE

RELATED APPLICATIONS

This application claims priority to and the benefit of the filing date of U.S. Provisional Patent Application No. 61/495,654, filed Jun. 10, 2011, which application is hereby incorporated by reference into the specification of this application.

BACKGROUND

The present exemplary embodiment relates to a line guide attachable to a fishing rod. It finds particular application in conjunction with line guides mountable to a ring of an existing line guide of a fishing rod, and will be described with particular reference thereto. However, it is to be appreciated that the present exemplary embodiment is also amenable to other like applications.

Fishing rods are typically provided with a number of spaced apart rings for guiding line from a rod tip to a reel mounted on a butt end of the fishing rod. The rings, often referred to as line guides, generally vary in sizes from a smallest diameter ring located at the tip of the fishing rod to a largest diameter ring located towards the butt end of the fishing rod and closest to the reel mounted to the fishing rod. The line guides serve to guide fishing line from the reel to the rod tip during casting operations, and serve to guide the fishing line from the tip of the rod back to the reel during retrieval, as well as to bear the load created on the fishing line during fish fighting operations.

One type of fishing reel that is commonly used is a spinning reel. A spinning reel generally includes a fixed spool of fishing line having a central axis that is aligned and spaced apart from a longitudinal axis of the fishing rod. In general, during casting the fishing line is stripped off of the spool in a helical fashion. This is because the spool of fishing line itself does not spin during casting or retrieval but, rather, the fishing line is pulled axially off the spool during casting. During retrieval, a spinning bale of the reel retrieves the fishing line and wraps it around the spool.

As it is generally desirable to have the ability to cast as far as possible, various attempts have been made to reduce the friction between the line and the ring guides during casting operations to maximize casting efficiency. Many attempts have focused on reducing friction between the line and the ring of a line guide by providing low friction coatings to the ring surfaces which the line contacts during casting.

Another approach is set forth in U.S. Pat. No. 6,230,432 to "Blank". In Blank, a line guide for a fishing rod consists of a specific trumpet-shaped tubular guide ring having an interior surface consisting entirely of a polished ceramic or hardened metal. Blank discloses providing this trumpet-shaped tubular guide ring on a closest line guide of a fishing rod to the fishing reel. The Blank tubular guide ring is designed to focus the fishing line during a cast by gradually reducing the diameter of the passageway through which the fishing line must pass. According to Blank, the guide is believed to focus the line into a more straight path more quickly from the initial large diameter helical coil of line coming off of the reel that exists between the reel and the first line guide. These approaches have not been fully effective.

BRIEF DESCRIPTION

The present disclosure sets forth a tubular guide ring that is mountable to a line guide of a fishing rod and that is capable of flexing to accommodate a range of line angles during retrieval, casting and fish fighting operations. Unlike prior art designs that do not flex, the design of the present disclosure is flexible and accommodates the load created on the fishing line as a fish is fought.

In accordance with one aspect, a detachable line guide ring apparatus mountable to a line guide of an associated fishing rod comprises a resilient tubular member having a passageway through which fishing line can travel, and an annular retainer member removably securable to a ring of a line guide of the associated fishing rod, the retainer member adapted to secure the resilient tubular member to the ring such that the resilient tubular member is generally coaxial with the ring and extends from a single axial side of said ring.

The resilient tubular member can include a conical or semi-conical coil spring. The conical or semi-conical coil spring can include first and second axial ends having respective first and second openings, the passageway extending between said openings, and the first opening having a larger diameter than the second opening. The retainer member can include an annular body having a radially inwardly extending end wall and a tapered surface spaced apart axially from the end wall, the end wall and the tapered surface defining therebetween a circumferential groove configured to receive a portion of the first axial end of the coil spring. The circumferential groove can be sized to accommodate a radially outer portion of the ring of the line guide of the associated fishing rod, whereby when the retainer member is secured to the ring, a portion of the coil spring is trapped between the retainer member and the ring. The end wall can be comprised of a plurality of radially inwardly extending and circumferentially spaced apart retention tabs. The tapered surface can be comprised of a plurality of circumferentially spaced apart axially extending and radially inwardly slanting protrusions. The resilient tubular member can include a conical or frustoconical wire coil spring having a wire diameter between approximately, for example, 0.020" to 0.070". The resilient tubular member can be flexible about a longitudinal axis thereof. The retainer member can be flexible.

In accordance with another aspect, a fishing rod comprises a butt end, a tip end opposite the butt end and a plurality of line guides mounted to the rod between the butt end and the tip end, and the detachable line guide ring apparatus mounted to a line guide closest to the butt end of the fishing rod. The resilient tubular member of the detachable line guide ring can be coaxially aligned with a ring of the line guide of the fishing rod closest to the butt end thereof, and can extend from a single side of the ring towards the tip end of the fishing rod. The resilient tubular member can have a longitudinal axis spaced apart from the longitudinal axis of the fishing rod.

In accordance with another aspect, a line focusing attachment for a first line guide of a fishing line closest to a butt end thereof comprises a conical or frustoconical coil spring having a wide end and a narrow end, and a flexible retainer ring having a central opening through which the wide end of the coil spring is restricted from passing and through which the narrow end of the coil spring can freely pass. The coil spring is telescopable through the central opening of the retainer until the wide end of the coil spring contacts a tapered surface of the retainer. The retainer includes at least one tab for snap fitting the retainer to a ring of the first line guide of the fishing rod with the coil spring supported by the retainer.

In accordance with another aspect, a fishing rod comprises a rod member having a butt end and a tip end, and a plurality of line guides mounted to the rod member and spaced along an axial length of the rod member. A first line guide closest to the butt end of the rod member includes a conical or semi-conical spring having a passageway through which line of an associated fishing reel can pass, said spring including first and second axial ends having respective first and second openings with the passageway extending between said openings, the first opening having a larger diameter than the second opening and positioned closest to the butt end of the fishing rod.

The conical or semi-conical spring can include a wire spring having a tag end which is turned down along a coil of the spring facing the first axial end to prevent line snagging. The conical or semi-conical spring can be removably secured to a guide ring of the first line guide.

DETAILED DESCRIPTION

Figure 1:
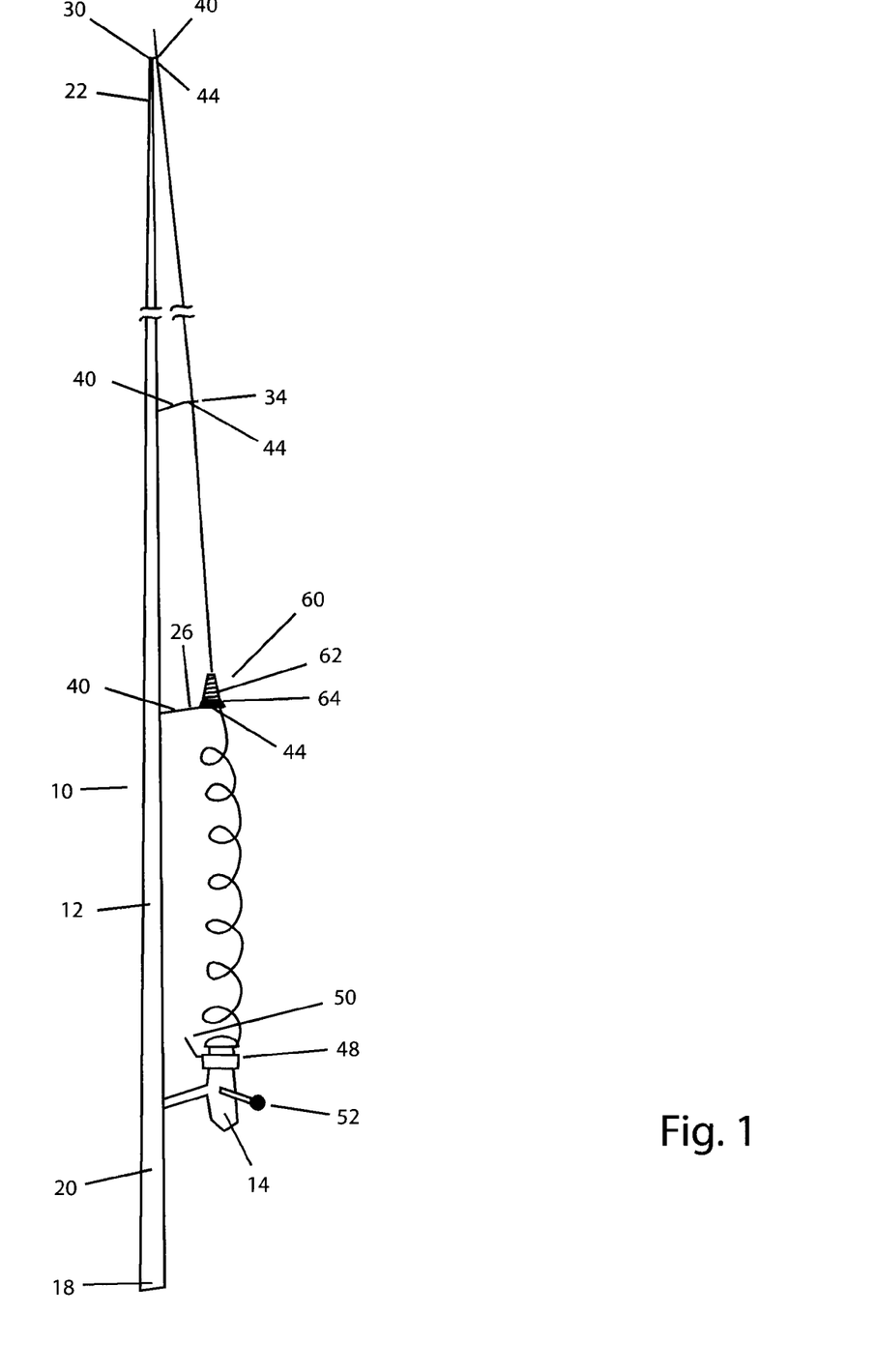
FIG. 1 is side view of an exemplary fishing rod including the line guide ring of the present disclosure.

With reference to FIG. 1, an exemplary fishing rod and reel assembly is illustrated and identified generally by reference numeral 10. The fishing rod and reel assembly generally comprises a fishing rod 12 and a fishing reel 14 mounted to the fishing rod 12. The fishing rod 12 has a butt end 18 including a handle 20, and a tip end 22 opposite the butt end 18. A plurality of line guides are mounted to the fishing rod 12 including a first line guide 26 mounted closest to the reel 14. A tip line guide 30 mounted at a tip of the fishing rod 12 and a one or more intermediate line guides 34 mounted between the first line guide 26 and the tip line guide 30. Each of the line guides includes a line guide support 40 attached to the rod 12 and a line guide ring 44 supported by the line guide support. The reel 14 includes a spool 48 on which fishing line is wound around, a bale 50 for releasing the fishing line during casting and for wrapping the fishing line around the spool 48 during retrieval, and a hand crank 52 for rotating the bale 50. The aforedescribed rod and reel combo 10 is representative of existing spinning rod and reel combos available on the market.

In accordance with the present disclosure, the first line guide 26 of the rod 12 includes a detachable line guide ring apparatus 60 mounted to line guide support 40 and the corresponding line guide ring 44 of line guide 26. The detachable guide ring apparatus 60 includes a resilient tubular member in the form of a coil spring 62, and an annular retainer member 64 that is removable and securable to line guide support 40 and the corresponding line guide ring 44 of line guide 26 of the fishing rod 12. The retainer member 64 is adapted to secure the coil spring 62 to line guide support 40 and the corresponding line guide ring 44 of line guide 26 such that the coil spring 62 is generally aligned coaxial with the line guide ring 44 and extends from a single axial side of line guide ring 44 towards the tip end 22 of the fishing rod 12.

Figure 2:
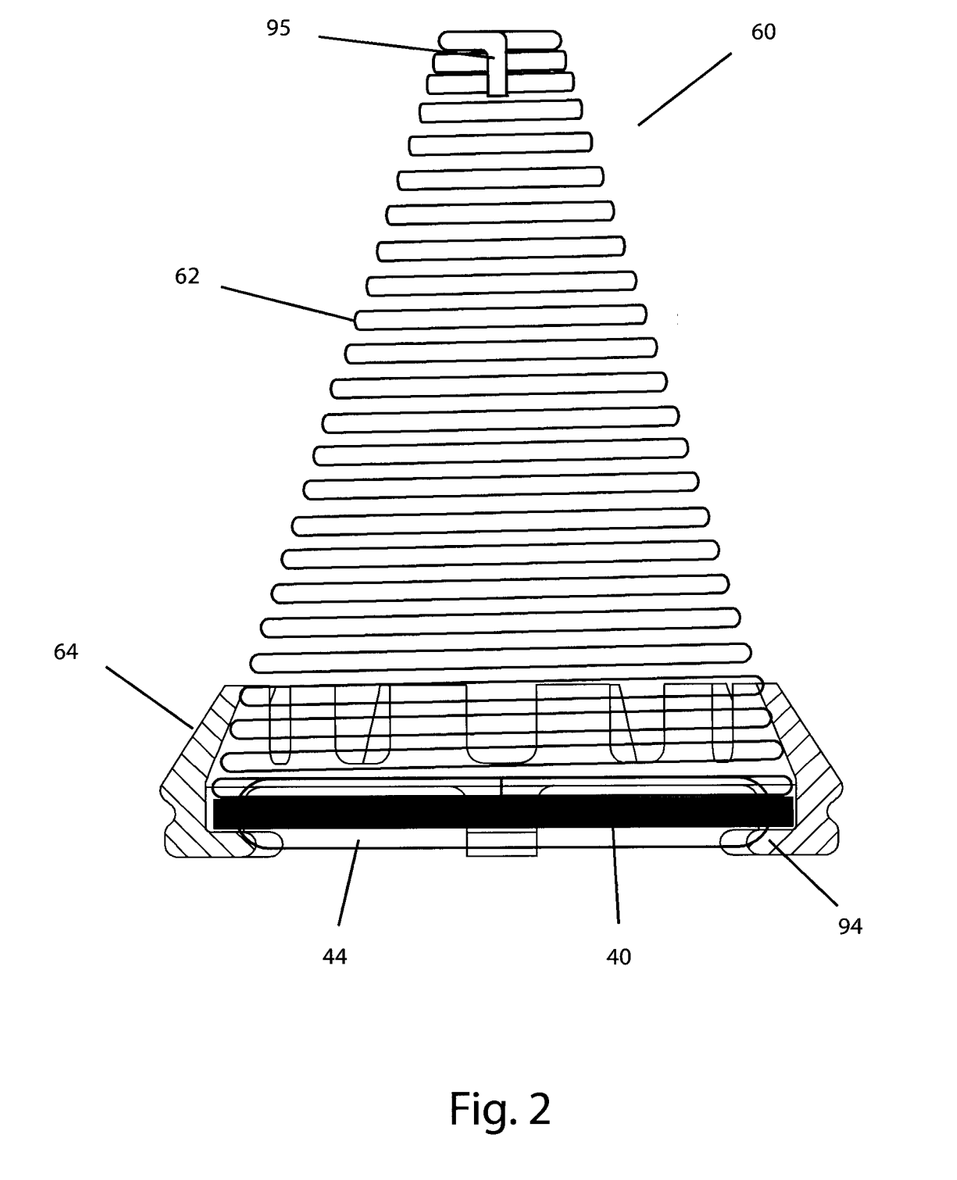
FIG. 2 is an enlarged partial cross-sectional side view of the line guide ring in accordance with the present disclosure.

Turning to FIG. 2, an enlarged view of the detachable line guide ring apparatus 60 is illustrated, with the annular retainer 64 being shown in cross section. As will be appreciated, the coil spring 62 in the illustrated embodiment is of a conical or frustoconical shape and is a wire coil spring having a wire diameter of between 0.020" to 0.070". The coil spring 62 generally includes a first axial end opening having a large diameter, a second axial end opening having a smaller diameter and a tag end 95 which is turned down along the coil spring 62 facing the first axial end or is welded closed, this prevents the fishing line from snagging in the coil spring 62, and an internal passageway extending between the first and second axial end openings through which fishing line can travel during casting, retrieval and fish fighting operations. Although a coil spring 62 is illustrated, other flexible and/or resilient tubular members can be used in place of the coil spring 62 without departing from the scope of the present disclosure. For example, certain rubber or other flexible materials could be used in place of, or in conjunction with, coil spring 62. Coil spring 62 is secured to line guide support 40 and the corresponding line guide ring 44 of line guide 26 by retainer member 64. To this end, the large axial end of the coil spring 62 is trapped radially between a radially inner surface of the retainer member 64 and a radially outer surface of the line guide ring 44.

Figure 3:
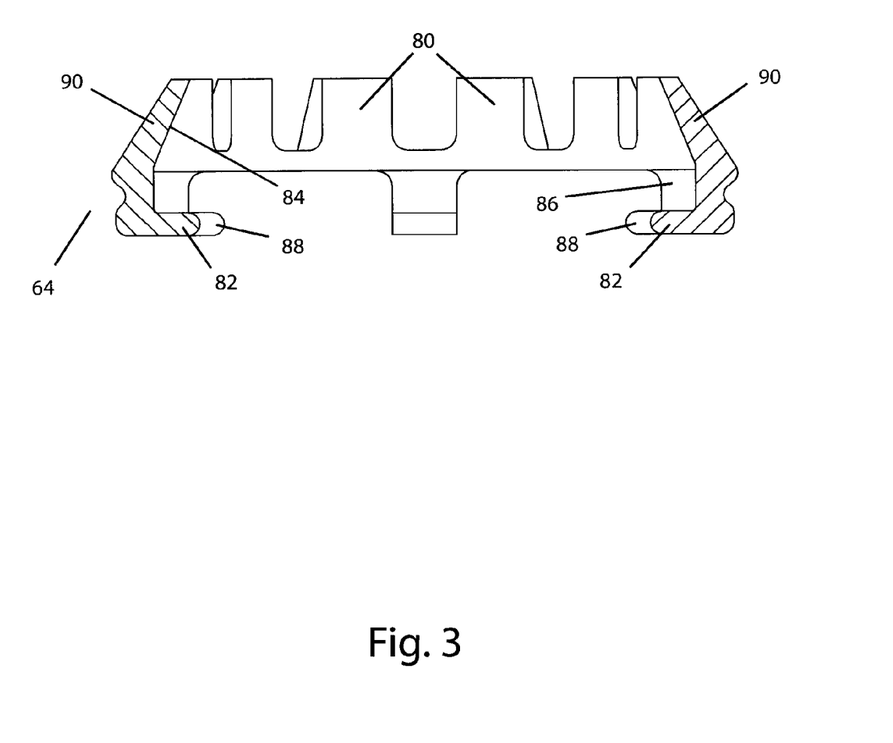
FIG. 3 is partial cross-sectional view of a retainer member of the line guide ring apparatus of FIG. 2.
Figure 4:
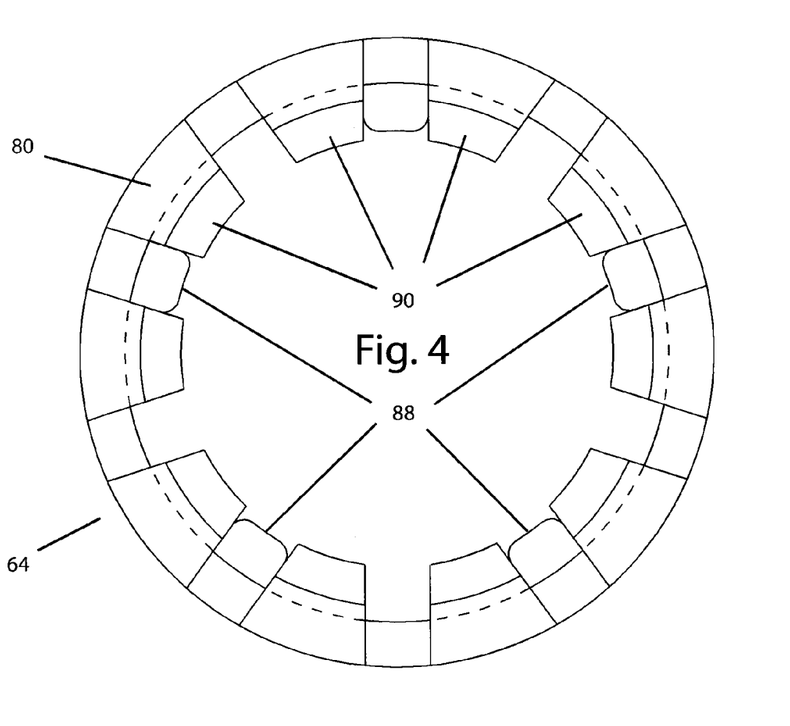
FIG. 4 is a top view of the retainer member of FIG. 3.
Figure 5:
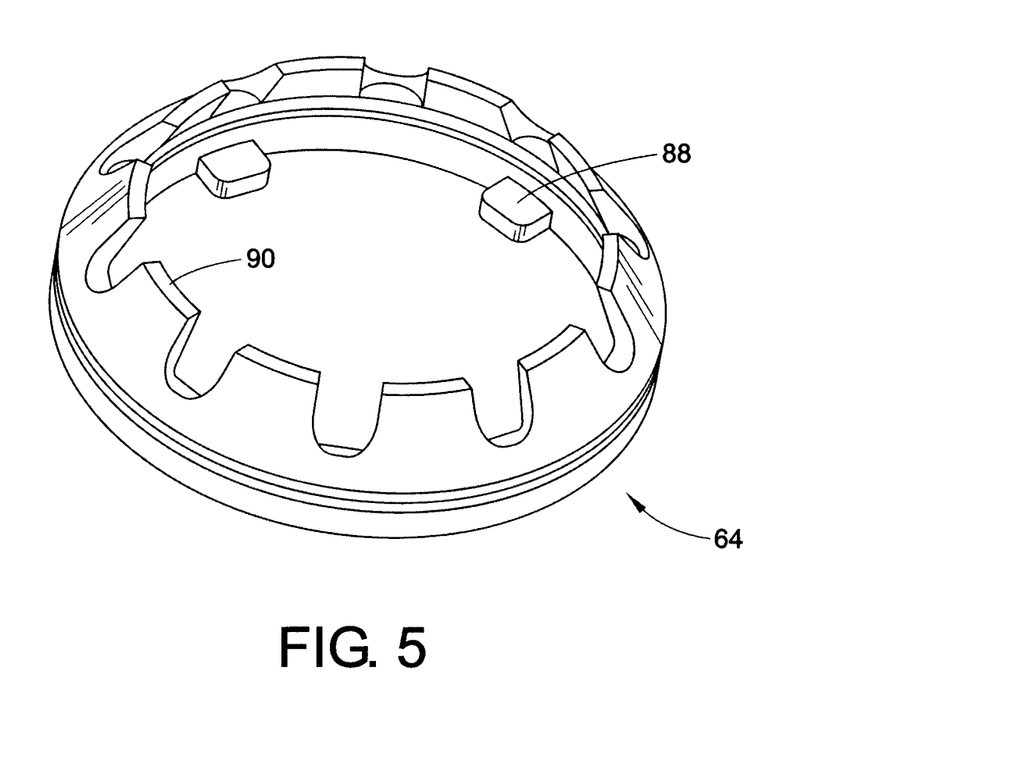
FIG. 5 is a perspective view of the retainer member of FIG. 3.

Turning to FIGS. 3-5, and initially to FIG. 3, the retainer member 64 is illustrated in cross-sectional view with the spring 62 removed for clarity. The retainer member 64 includes an annular body 80 having a radially inwardly extending end wall 82 and a tapered radially inwardly facing surface 84 that is spaced apart from the end wall such that the end wall 82 and the tapered surface 84 define therebetween a circumferential groove 86 that is configured to receive a portion of the first (larger) axial end of the coil spring 62. It will be appreciated that the coil spring 62 diameter at its large axial end is larger than a central opening of the retainer member 64 such that the narrow end of the spring 62 can pass freely through the retainer member 64 while the wider end of the spring 62 is prevented from passing through the central opening of the retainer member 64.

Although end wall 82 can be continuous, it will be appreciated that the end wall 82 of the illustrated embodiment is comprised of a plurality of retention tabs 88 that are configured to engage a surface of line guide support 40 and the corresponding line guide ring 44 of line guide 26. Gaps between adjacent tabs 88 can accommodate the line guide support 40 therebetween. Similarly, in the illustrated embodiment, the radially inwardly tapered surface 84 is comprised of a plurality of circumferentially spaced apart, axially extending, and radially inwardly slanting protrusions 90. Of course, either or both of the end wall 82 and/or the tapered surface 84 could be formed as a continuous surface or end wall.

It will be appreciated that to assemble the detachable line guide ring apparatus to a ring of a line guide, such as line guide 26, the coil spring 62 is first inserted narrow end first into retainer member 64 until the wide end of the coil spring 62 is seated in the circumferential groove 86 of the retainer member. The retainer member 64 is snapped or otherwise urged into place on the line guide support 40 and the corresponding line guide ring 44 of line guide 26 to the final position (see FIG. 2) whereat the coil spring 62 is trapped radially between a radially outer surface of the ring 44 and the retainer member 64. To facilitate attachment of the retainer member 64 to line guide support 40 and the corresponding line guide ring 44 of line guide 26, the retainer member 64 can be comprised of plastic or another flexible material, or portions thereof can be flexible, such that the retainer member 64 can be deformed slightly to allow attachment to line guide support 40 and the corresponding line guide ring 44 of line guide 26 into position within the retainer member 64.

The disclosed detachable line guide apparatus provides numerous benefits over prior art designs. For example, the two piece line guide ring apparatus is easily and readily attached to any existing line guide of appropriate size. The retainer member 64 provides a secure attachment mechanism to securely install the spring 62 to a ring of a line guide support. The spring 62, being flexible about its longitudinal axis is able to accommodate a wider variety of line angles during casting, retrieval and fish fighting operations.

Figure 6:
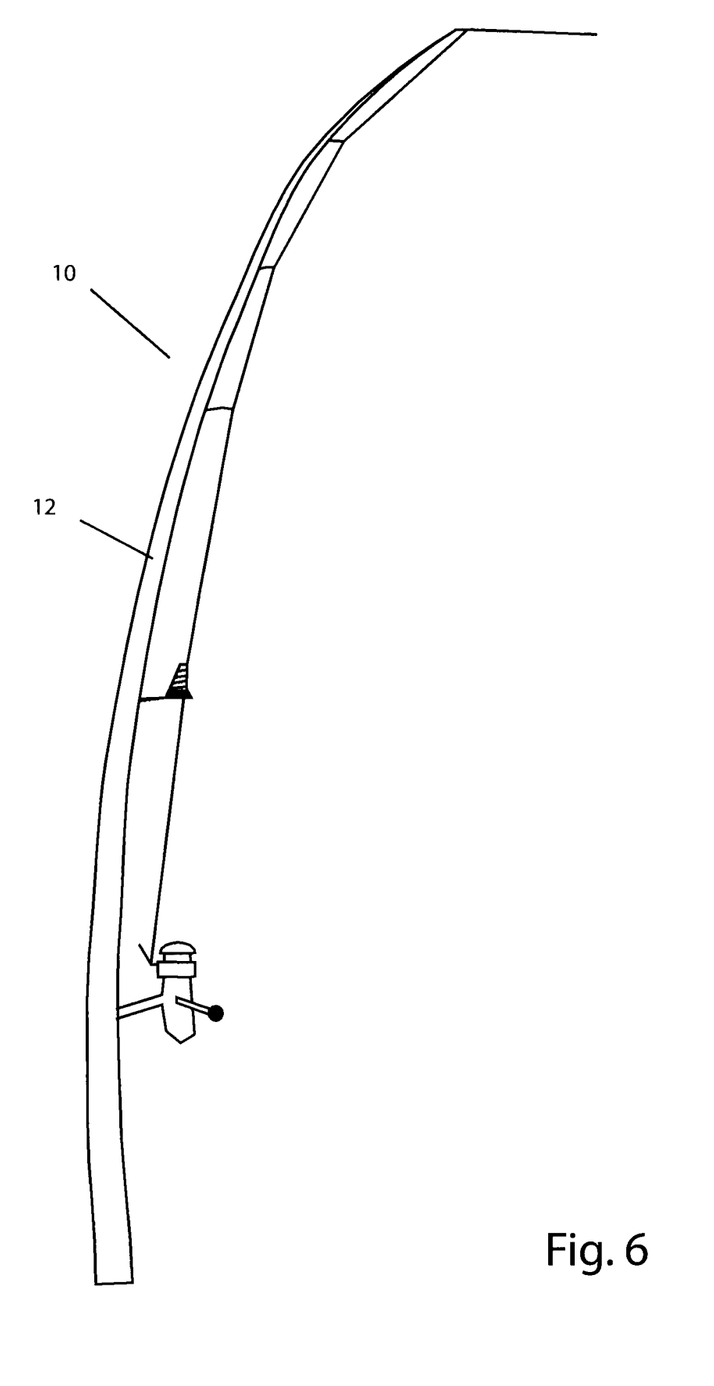
FIG. 6 is a side view of a fishing rod including the line guide ring apparatus, the fishing rod being in an actively bent configuration.

For example, in FIG. 6 the fishing rod and reel combo 10 of FIG. 1 is illustrated in an actively bent configuration such as might be found when an angler is fighting a fish. It will be appreciated that the rod 12 is bent about its longitudinal axis which results in axial misalignment between the line guides of the rod and, consequently, angle changes of the line as it passes through each successive line guide.

Unlike prior art tubular line guides that are rigid and coaxially aligned with a line guide of the fishing rod, the line guide in accordance with the present disclosure is flexible which allows the line guide to move to accommodate different incoming line angles as shown in FIG. 6. This reduces friction and can prevent line breakage during extreme rod bending and/or fish fighting activity. It is also believed that the flexibility of the line guide ring apparatus of the present disclosure can also be beneficial during casting operations as the rod flexes back and forth.

Returning to FIG. 2, it should also be noted that a resilient damping element 94 can optionally be interposed between the spring 62 and the line guide ring 44 for reducing or eliminating vibration transfer between the spring 62 and the ring 44. Resilient damping member 94 can be a rubberized coating or overmolding or the like provided on a surface of the spring 62 or, as illustrated, on a surface of the retainer member 64. In an alternative embodiment, the damping element can be a separate component such as a rubber gasket or o-ring, for example. The damping element can be advantageous for preventing any vibration generated by movement of the spring 62 from entering the rod 12 and being transmitted to the handle grip 20 where it may be possibly detected by a fisherman.

Figure 7:
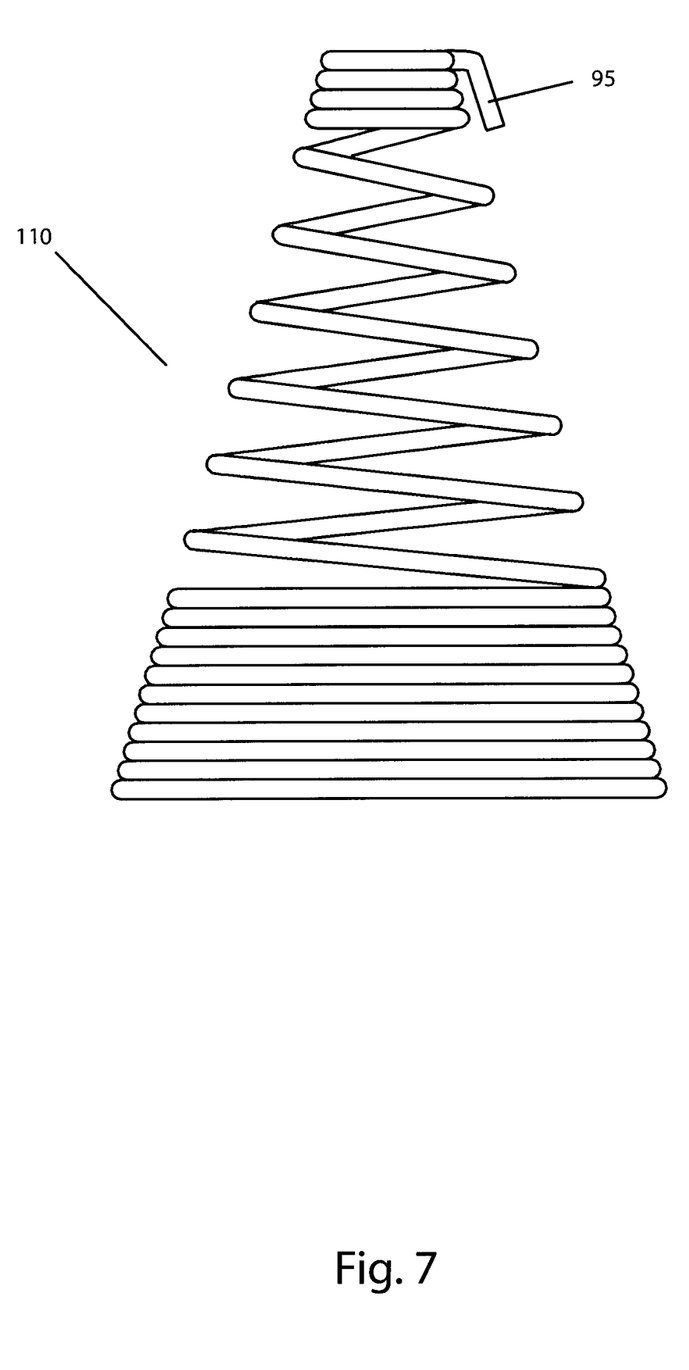
FIG. 7 is a cross-sectional view of another exemplary conical spring in accordance with the present disclosure.

It will be appreciated that the conical spring 62, although shown as having spaces between adjacent coils, can provide a substantially continuous interior conical or frustoconical surface comprised of the windings of spring 62. The interior surface of spring 62 can be coated with any suitable low friction coating for further reducing friction between the line and the interior surface of the spring 62 and a tag end 95 which is turned down along the coil spring 62 facing the first axial end or is welded closed. In addition, the conical spring can have windings with various axial spacings therebetween, such as spring 110 of FIG. 7.

It will be appreciated that the conical spring of the present disclosure smoothly transforms the circular or helical motion of the line coming off the reel's spool into linear motion, which is believed to result in higher rotations per minute of line being pulled off the reel's spool, which in turn increases line speed and casting distance. The conical spring flexes as the rod bends allowing the fishing line to rest on the existing rod line guide ring, resulting in reduced fiction as compared to prior art rigid tubular line guides.

In addition, the conical spring places a slight tension on the line as it is being retrieved, resulting in reduced slack line being put onto the reel's spool. This action reduces wind knots caused by slack line on the reel's spool. Without being bound by theory, it is believed that during retrieval of the line, the rotation of the bale of the spinning reel moves the line in a relatively large circular motion as the line is wrapped around the spool. This motion causes the line entering the narrow end of the spring to deflect the spring slightly in a corresponding circular motion. The deflection of the spring places tension on the line between the spring and the reel and reduces slack line being put onto the reel's spool.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A detachable line guide ring apparatus mountable to a line guide of an associated fishing rod comprising:
    a resilient tubular member having a passageway through which fishing line can travel; and
    an annular retainer member removably securable to a ring of a line guide support of the associated fishing rod, the retainer member adapted to secure the resilient tubular member to the line guide support and line guide ring such that the resilient tubular member is generally coaxial with the line guide ring and extends from a single axial side of said line guide ring;
    wherein the resilient tubular member includes a conical or semi-conical coil spring including first and second axial ends having respective first and second openings, the passageway extending between said openings, the first opening having a larger diameter than the second opening, and
    wherein the retainer member includes an annular body having a radially inwardly extending end wall and a tapered surface spaced apart axially from the end wall, the end wall and the tapered surface defining therebetween a circumferential groove configured to receive a portion of the first axial end of the coil spring.

2. A detachable line guide ring apparatus as set forth in claim 1, wherein the circumferential groove is sized to accommodate a radially outer portion of the line guide ring and line guide support of the associated fishing rod, whereby when the retainer member is secured to the line guide support ring, a portion of the coil spring is trapped between the retainer member and the line guide ring.

3. A detachable line guide ring apparatus as set forth in claim 2, further comprising a damping element disposed in the circumferential groove.

4. A detachable line guide ring apparatus as set forth in claim 1, wherein the end wall is comprised of a plurality of radially inwardly extending and circumferentially spaced apart retention tabs.

5. A detachable line guide ring apparatus as set forth in claim 1, wherein the tapered surface is comprised of a plurality of circumferentially spaced apart axially extending and radially inwardly slanting protrusions.

6. A detachable line guide ring apparatus as set forth in claim 1, wherein the resilient tubular member includes a conical or frustoconical wire coil spring having a wire diameter between 0.020" to 0.070".

7. A detachable line guide ring apparatus as set forth in claim 6, wherein the conical or semi-conical coil spring includes first and second axial ends having respective first and second openings, the passageway extending between said openings, the first opening having a larger diameter than the second opening and including a tag end of wire that is turned down along the wire coil spring facing the first axial larger end to prevent line snagging.

8. A detachable line guide apparatus as set forth in claim 1, wherein the resilient tubular member is flexible about a longitudinal axis thereof.

9. A detachable line guide apparatus as set forth in claim 1, wherein the retainer member is flexible.

10. A fishing rod comprising a butt end, a tip end opposite the butt end, and plurality of line guides mounted to the rod between the butt end and the tip end, and a detachable line guide ring apparatus mounted to a line guide closest to the butt end of the fishing rod, the detachable line guide ring apparatus including a resilient tubular member having a passageway through which fishing line can travel, and an annular retainer member removable securable to a ring of the line guide closest to the butt end of the fishing rod, the retainer member adapted to secure the resilient tubular member to the ring such that the resilient tubular member is generally coaxial with the ring and extends from a single axial side of said ring.

11. A fishing rod as set forth in claim 10, wherein the resilient tubular member has a longitudinal axis spaced apart from a longitudinal axis of the fishing rod.

12. A fishing rod as set forth in claim 10 wherein the line guide closest to the butt end of the fishing rod includes a guide ring apparatus supported by a line guide support, wherein the retainer member includes an annular body having a radially inwardly extending end wall and a tapered surface spaced apart axially from the end wall, the end wall and the tapered surface defining therebetween a circumferential groove configured to receive a portion of the first axial end of a coil spring defining the resilient tubular member, wherein the end wall is comprised of a plurality of radially inwardly extending and circumferentially spaced apart retention tabs, and wherein at least a portion of the line guide support is received in a gap between adjacent retention tabs.

13. A line focusing attachment for a first line guide of a fishing rod closest to a butt end thereof, the line focusing attachment comprising:

a conical or frustoconical coil spring having a wide end and a narrow end and a tag end which is turned down along the coil spring towards the large end or is welded closed; and a flexible retainer ring having a central opening through which the wide end of the coil spring is restricted from passing and through which the narrow end of the coil spring can pass freely;

wherein the coil spring is telescopable through the central opening of the retainer until the wide end of the coil spring contacts a tapered surface of the retainer; and wherein the retainer includes at least one tab for snapfitting the retainer to a line guide support and line guide ring of the first line guide of the fishing rod with the coil spring supported by the retainer.

14. A fishing rod comprising:

a rod member having a butt end and a tip end; and a plurality of line guides mounted to the rod member and spaced along an axial length of the rod member;

wherein a first line guide closest to the butt end of the rod member includes a conical or semi-conical spring having a passageway through which line of an associated fishing reel can pass, said spring including first and second axial ends having respective first and second openings with the passageway extending between said openings, the first opening having a larger diameter than the second opening and positioned closest to the butt end of the fishing rod.

15. A fishing rod as set forth in claim 14, wherein the conical or semi-conical spring includes a wire spring having a tag end which is turned down along a coil of the spring facing the first axial end to prevent line snagging.

16. A fishing rod as set forth in claim 14, wherein the conical or semi-conical spring is removably secured to a guide ring of the first line guide.

* * * * *